A. H. SMITH.
Stone-Crushers.

No. 140,085.

Patented June 17, 1873.

Witnesses,
Chas H Smith
Geo. S. Pinckney

Inventor,
Austin H. Smith,
Lemuel W. Serrell

UNITED STATES PATENT OFFICE

AUSTIN H. SMITH, OF BROOKLYN, NEW YORK.

IMPROVEMENT IN STONE-CRUSHERS.

Specification forming part of Letters Patent No. 140,085, dated June 17, 1873; application filed January 15, 1873.

*To all whom it may concern:*

Be it known that I, AUSTIN H. SMITH, of Brooklyn, in the county of Kings and State of New York, have invented an Improvement in Stone-Crushing Apparatus, of which the following is a specification:

In machines for crushing stone for pavement, &c., it is usual to employ a hopper made of three stationary sides and a moving side or jaw, the hopper being wedge-shaped, with two of the stationary sides parallel, and the stationary and moving jaws converging toward the delivery-mouth at the bottom. As the crushing operation progresses in a hopper of this character, the stone is necessarily spread laterally as it descends toward the delivery-mouth; but being confined by the parallel sides, the power expended in operating the moving jaw is necessarily increased by the material clogging, and not cracking up and freely dropping out, and the stone is unnecessarily reduced to dust or particles that are too small.

My present invention is made for preventing the crushing-jaws clogging, and thereby lessening the power employed, and preventing the stone being ground too fine; and said invention consists in a hopper for a stone-crushing machine made with the lower portion of greater width than the upper portion, and the moving jaw with diverging sides, so as to be broadest at the bottom of the crushing-face; thereby ample space will be given for the stone to spread laterally as it is crushed, and fall away as soon as it is reduced to the proper size to pass out of the mouth. I also adjust the axis upon which the moving jaw swings, to give greater or less space between the jaws of the hopper, and allow the jaw to be drawn back bodily when the size of the crushed stone is to be enlarged.

Figure 1:
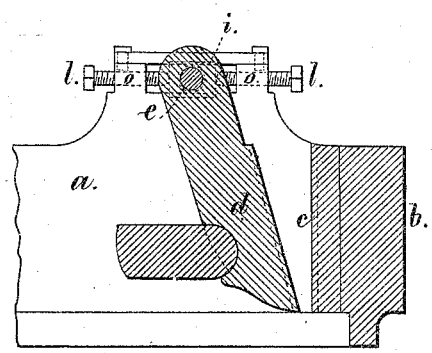
Figure 2:
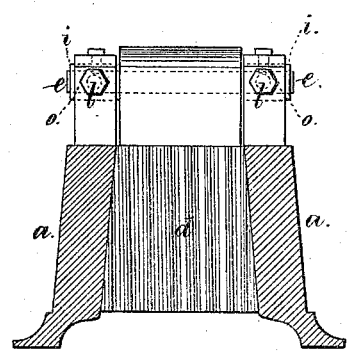

In the drawing, Figure 1 is a section transversely of the jaws; and Fig. 2 is a section at right angles thereto, taken lengthwise of the delivery-mouth.

The sides $a$ $a$ and end $b$ are cast or securely connected together. $c$ is the stationary crushing-plate or jaw; and $d$ is the swinging jaw that is hung upon the cross-shaft or trunnions $e$, in boxes $i$, that are sustained upon the sides $a$ $a$, and adjusted in position by the screws $l$, through lugs $o$. The distance between the sides $a$ $a$ at the bottom of the hopper is greater than it is at the top, and the jaws $c$ and $d$ are made to correspond.

By this construction, the delivery-mouth is made wider than the hopper at the upper end, to give ample space for the crushed stone to spread laterally as the same descends in the hopper and is reduced in size by the crushing action of the jaws, the moving jaw being operated by suitable power.

I claim as my invention—

1. The hopper for a stone-crushing machine made with the delivery-mouth wider than the upper end of the hopper, and the crushing-jaws wider at the bottom than the top, for the purposes set forth.

2. The boxes $i$, adjusted by the screws $l$, in combination with the shaft or trunnions of the swinging jaw $d$, as and for the purposes set forth.

Signed by me this 11th day of January, 1873.

AUSTIN H. SMITH.

Witnesses:
GEO. T. PINCKNEY,
CHAS. H. SMITH.